United States Patent
Tang

(10) Patent No.: US 12,422,869 B2
(45) Date of Patent: Sep. 23, 2025

(54) POWER DISTRIBUTION FOR TEMPERATURE REGULATION OF HOME APPLIANCES

(71) Applicant: SharkNinja Operating LLC, Needham, MA (US)

(72) Inventor: Hanning Tang, Belmont, MA (US)

(73) Assignee: SharkNinja Operating LLC, Needham, MA (US)

( * ) Notice: Subject to any disclaimer, the term of this patent is extended or adjusted under 35 U.S.C. 154(b) by 140 days.

(21) Appl. No.: 18/350,852

(22) Filed: Jul. 12, 2023

(65) Prior Publication Data
US 2025/0021117 A1    Jan. 16, 2025

(51) Int. Cl.
    *G05D 23/19*    (2006.01)
    *A45D 20/12*    (2006.01)
    *G05D 23/24*    (2006.01)

(52) U.S. Cl.
    CPC ......... *G05D 23/1919* (2013.01); *A45D 20/12* (2013.01); *G05D 23/1904* (2013.01); *G05D 23/24* (2013.01)

(58) Field of Classification Search
    None
    See application file for complete search history.

(56) References Cited

U.S. PATENT DOCUMENTS

| | | | |
|---|---|---|---|
| 6,449,870 B1 * | 9/2002 | Perez | A45D 20/30 |
| | | | 392/374 |
| 6,640,049 B1 * | 10/2003 | Lee | A45D 20/08 |
| | | | 34/96 |
| 6,703,587 B2 * | 3/2004 | Sena | A45D 20/12 |
| | | | 132/229 |

(Continued)

FOREIGN PATENT DOCUMENTS

| | | |
|---|---|---|
| CN | 102783804 B | 12/2014 |
| CN | 111083811 A | 4/2020 |

(Continued)

OTHER PUBLICATIONS

International Search Report and Written Opinion received for PCT/US2024/032774, mailed on Oct. 4, 2024, 9 pages.

*Primary Examiner* — Thor S Campbell
(74) *Attorney, Agent, or Firm* — Mintz, Levin, Cohn, Ferris, Glovsky and Popeo, P.C.

(57) ABSTRACT

Various exemplary devices, systems, and methods for power distribution for temperature regulation of home appliances are provided. In general, in some implementations an apparatus includes a first heating element and a second heating element configured to generate heat to be output in response to being powered with alternating current (AC) power. The apparatus includes a temperature sensor configured to detect a temperature of the generated heat and a processor configured to, based on the temperature, generate a set of cycles with a random distribution of a total AC power percentage among the cycles. An AC power percentage of each of the cycles is within a set of AC power percentage values, to control the first heating element and the second heating element such that the total AC power percentage leads to a temperature adjustment to reach a reference temperature.

15 Claims, 9 Drawing Sheets

(56) References Cited

U.S. PATENT DOCUMENTS

| | | | |
|---|---|---|---|
| 6,732,449 B2 * | 5/2004 | Evanyk | A45D 20/12 |
| | | | 34/96 |
| 6,889,445 B1 | 5/2005 | Varona et al. | |
| 7,380,347 B2 | 6/2008 | Coats et al. | |
| 9,603,430 B2 | 3/2017 | Seo | |
| 9,872,521 B2 | 1/2018 | Farine et al. | |
| 10,455,916 B2 | 10/2019 | Moore | |
| 11,064,783 B2 | 7/2021 | Nelson et al. | |
| 11,517,091 B2 | 12/2022 | Conrad | |
| 11,583,052 B2 | 2/2023 | Friedman et al. | |
| 2020/0345118 A1 | 11/2020 | Friedman et al. | |
| 2021/0251362 A1 | 8/2021 | Loke et al. | |
| 2021/0321738 A1 | 10/2021 | Ni | |
| 2022/0022621 A1 | 1/2022 | Friedman et al. | |
| 2022/0290897 A1 | 9/2022 | Yu | |
| 2023/0371671 A1 * | 11/2023 | Howard | A45D 20/12 |
| 2024/0167727 A1 * | 5/2024 | Cardoso | F24H 15/37 |

FOREIGN PATENT DOCUMENTS

| | | |
|---|---|---|
| CN | 108618331 B | 11/2020 |
| CN | 111132389 B | 5/2021 |
| CN | 108835832 B | 7/2021 |
| CN | 110801169 B | 7/2021 |
| CN | 113439921 A | 9/2021 |
| CN | 112835399 B | 3/2022 |
| CN | 114828305 A | 7/2022 |
| EP | 3626114 A3 | 6/2020 |
| JP | S62249380 A | 10/1987 |
| WO | 2018184664 A1 | 10/2018 |
| WO | 2022022598 A1 | 2/2022 |
| WO | 2022229597 A1 | 11/2022 |
| WO | 2022229598 A1 | 11/2022 |
| WO | 2022229600 A1 | 11/2022 |
| WO | 2023000348 A1 | 1/2023 |

* cited by examiner

POWER % PER SINGLE CYCLE 0.67%

POWER % PER SINGLE CYCLE 1.33%

POWER % PER SINGLE CYCLE 2%

POWER % PER SINGLE CYCLE 2.6%

POWER % PER SINGLE CYCLE 3.3%

POWER % PER SINGLE CYCLE 4%

POWER DISTRIBUTION FOR TEMPERATURE REGULATION OF HOME APPLIANCES

FIELD

The present disclosure generally relates to power distribution for temperature regulation of home appliances.

BACKGROUND

Temperature-regulated home appliances, such as hair dryers, include at least one heater that provides heat at varying temperatures for various purposes. For example, hair dryer heats air and provides a flow of heated air that a user can utilize to dry wet hair.

Many home appliances are powered via alternating current (AC). A common challenge in temperature-regulated home appliances is associated with periodic large power variance over time. For example, turning a hair dryer's heater(s) on and off to control the hair dryer's heater(s) can cause periodic current draw on the AC input. In older homes (or other sites of temperature-regulated home appliances use) or in homes (or other sites of temperature-regulated home appliances use) with less ideal electrical wiring, the periodic current draw can cause light flickering, a circuit breaker trip, and/or appliance (e.g., microwave, fan, etc.) power fluctuation when the hair dryer is used in close vicinity or on the same "branch" circuit as the light or appliance. Vanity lights and nearby outlets to which the temperature-regulated home appliance is plugged into are typically particularly susceptible to such flickering and power fluctuation.

Accordingly, there remains a need for improved temperature regulation for home appliances.

SUMMARY

In general, devices, systems, and methods for power distribution for temperature regulation of home appliances are provided.

In one aspect, an apparatus is provided that in one embodiment includes a first heating element and a second heating element, the first and second heating elements being configured to generate heat to be output in response to being powered with alternating current (AC) power; a temperature sensor configured to detect a temperature of the generated heat; and a processor configured to, based on the temperature, generate a set of cycles with a random distribution of a total AC power percentage among the cycles, an AC power percentage of each of the cycles being within a set of AC power percentage values, to control the first heating element and the second heating element such that the total AC power percentage leads to a temperature adjustment to reach a reference temperature.

In some variations, one or more features disclosed herein including the following features can optionally be included in any feasible combination. In some implementations, the processor is configured to generate the set of cycles with the random distribution of the AC power percentage between cycles in response to completion of a previous set of cycles. In some implementations, the processor is further configured to receive the reference temperature corresponding to a setting of a temperature control button. In some implementations, the set of AC power percentage values includes a plurality of integers between a minimum AC power percentage and a maximum AC power percentage. In some implementations, the minimum AC power percentage is 0% and the maximum AC power percentage is 4%. In some implementations, the set of cycles includes twenty-five cycles. In some implementations, the temperature adjustment includes the processor controlling at least one of the first and second heating elements to increase or decrease the temperature. In some implementations, each of the set of cycles corresponds to a first predetermined number of periods of the AC power at which one of the first and second heating elements is turned on to heat the air to be output from the device. In some implementations, during a portion of the set of cycles the first heating element is configured to output heat more or equal to the heat output by the second heating element. In some implementations, the generated heat is configured to heat air output from the apparatus. In some implementations, the apparatus can be a hair dryer. In some implementations, the apparatus can further include a non-transitory computer-readable storage medium storing an algorithm configured to be executed by the processor to generate the set of cycles.

In another aspect, a method is provided that in one embodiment includes determining a temperature of a first heating element and of a second heating element; and generating a set of cycles with a random distribution of a total AC power percentage among the cycles, an AC power percentage of each of the cycles being within a set of AC power percentage values, to control the first heating element and the second heating element such that the total AC power percentage leads to a temperature adjustment to reach a reference temperature.

In some variations, one or more features disclosed herein including the following features can optionally be included in any feasible combination. In some implementations, the first and second heating elements are included in a hair dryer; and the method further includes outputting heated air from the hair dryer according to the generated set of cycles.

In another aspect, a non-transitory computer-readable storage medium is provided that in one embodiment includes programming code, which when executed by at least one data processor, causes operations including determining a temperature of a first heating element and of a second heating element; and generating a set of cycles with a random distribution of a total AC power percentage among the cycles, an AC power percentage of each of the cycles being within a set of AC power percentage values, to control the first heating element and the second heating element such that the total AC power percentage leads to a temperature adjustment to reach a reference temperature.

Implementations of the current subject matter can include, but are not limited to, methods consistent with the descriptions provided herein as well as articles that comprise a tangibly embodied machine-readable medium operable to cause one or more machines (e.g., computers, real-time operating systems, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

The accompanying drawings, which are incorporated in and constitute a part of the specification, show certain aspects of the subject matter disclosed herein and, together with the description, help explain some of the principles associated with the disclosed implementations. In the drawings.

Figure 1:
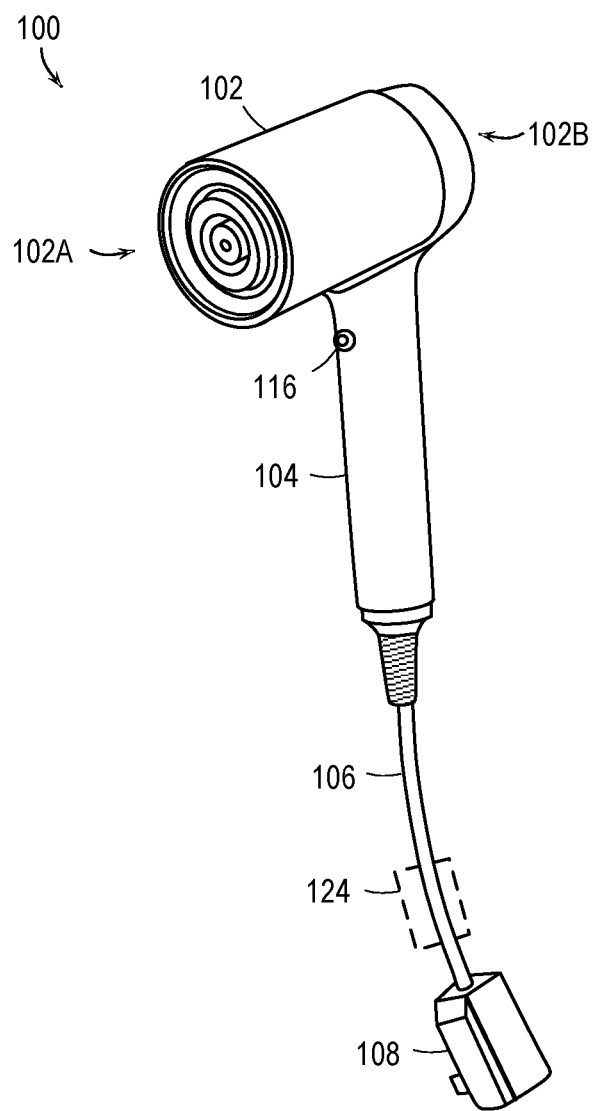
FIG. 1 is a perspective view of one embodiment of a hair dryer, according to some implementations of the current subject matter.

When practical, like labels are used to refer to same or similar items in the drawings.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Implementations of the present disclosure are generally directed to power distribution for temperature regulation of home appliances. In general, random waveform power distribution is configured to regulate temperature in a home appliance for a set number of cycles. A temperature sensor is configured to detect a temperature of heating element(s) of the home appliance. The detected temperature is used, e.g., by a controller of the home appliance, to generate a set of cycles with a random distribution of a total AC power percentage among the cycles. The heating element of the home appliance is provided, during each cycle, an AC power percentage that is within a set of AC power percentage values such that the total AC power percentage leads to a temperature adjustment to reach a reference temperature. The periodic large power variance over time of traditional temperature-regulated home appliances causes light bulbs or sensitive loads (like incandescent light bulbs) on the same power line to flicker. To avoid the light flickering, the implementations described herein include devices, systems, and methods for heater control using random power distribution. The random distribution of power percentage is configured to control the heating element(s) to output heat at a desired temperature (e.g., to a particular desired temperature or within a desired temperature range), while avoiding periodic current draw on the home appliance's AC input. Avoiding the periodic current draw reduces, if not entirely prevents, the home appliance from causing light flickering, causing inconvenient circuit breaker trips, and/or power fluctuation of other appliances (e.g., microwave, fan, etc.) on the same power line as the home appliance. It is therefore hard, if not impossible, for human to see the light flickering or otherwise detect power fluctuation of other appliances.

The power distribution described herein does not require a home appliance to include a bulky filtering components to meet International Electrotechnical Commission (IEC) requirements for certification (e.g., conducted emission (CE) certification, radiated emission (RE) certification, etc.). Instead, a small footprint controller and filtering components can be used within a housing of a home appliance, thereby freeing real estate within the housing for other components and/or allowing for a more compactly-sized home appliance.

Power distribution is described below with reference to hair dryers but can be implemented in other temperature-regulated home appliances, such as space heaters, that are configured to provide heat at varying temperatures for various purposes.

FIG. 1 illustrates one embodiment of a hair dryer 100 configured to include power distribution for temperature regulation. The hair dryer 100 includes a housing 102, a handle 104 extending from the housing 102 in a generally downward direction transverse to the housing 102, a cord (also referred to herein as a "power cable") 106 extending from the handle 104, and a plug 108 at an end of the cord 106 and configured to plug into a power outlet. A person skilled in the art will appreciate that the hair dryer 100 can have a variety of configurations and that the methods, systems, and devices described herein for power distribution for temperature regulation can be used with any hair dryer (or other home appliance) that uses heater(s) for heat control.

The housing 102 is in the form of a generally hollow body that is configured to contain components for operation of the hair dryer 100, such as a motor, a heater, a processor, and a memory. The housing 102 illustrated in FIG. 1 has a circular cross-section, but other cross-sectional shapes can be utilized. In order to allow the motor and heater to supply air, the housing 102 includes an input end 102B and an output end 102A arranged on opposite ends of the housing 102. The input end 102B is configured to allow for air intake into the housing 102, and the output end 102A is configured to supply air after passing through the motor and/or heater. The output end 102A of the hair dryer 100 can be configured to removably mate with an accessory (not shown), e.g., a concentrator, a diffuser, a brush, a curler, etc.

Since the process of hair drying can require directional control of the hair dryer, the handle 104 is included to allow for hand-held use of the hair dryer 100. The handle 104 can extend from the housing 102 in a fixed orientation, or the handle 104 can be movably (e.g., pivotally) attached to the housing 102. The handle 104 includes a power button 110, shown in FIG. 2, configured to be actuated by a user to selectively turn the hair dryer 100 on and off. The hair dryer's power control is in the form of a depressible button 110 in the illustrated embodiment but can have another form, such as a lever, a rotatable knob, etc. The hair dryer 100 can include other control mechanisms for controlling various aspects of the hair dryer 100.

Figure 2:
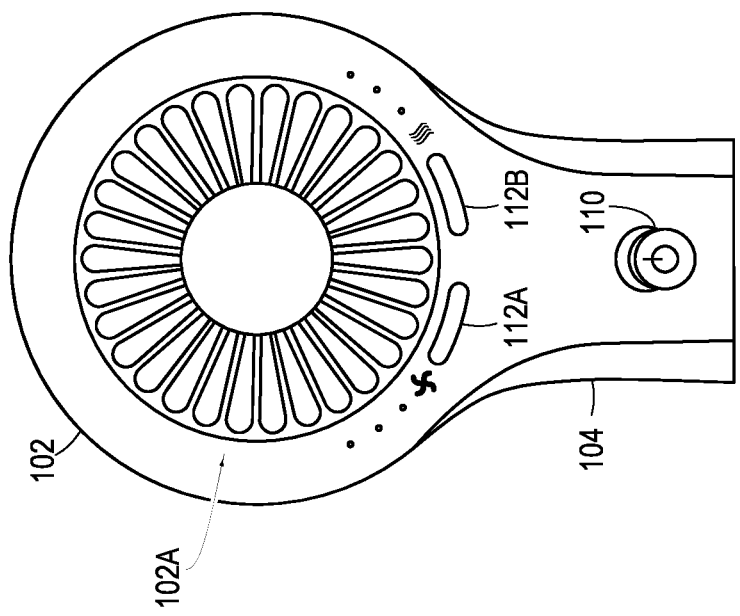
FIG. 2 is a rear view of a portion of the hair dryer of FIG. 1.

As shown in FIGS. 1 and 2, the hair dryer 100 in the illustrated embodiment includes an airflow control button 112A, a temperature control button 112B, a cool shot button 116, and a reset button (on the plug 108, obscured in FIG. 1 and visible in FIG. 2). The airflow control button 112A is configured to be actuated by a user to select an airflow speed. For example, actuation of the airflow control button 112A can toggle the hair dryer 100 between different airflow speeds, e.g., low, medium, and high. The temperature control button 112B is configured to be actuated by a user to select a heat level for air flowing out the output end 102A of the hair dryer 100. For example, actuation of the temperature control button 112B can toggle the hair dryer 100 between different heat settings, e.g., low, medium, and high or different temperature values within a temperature range (e.g., 27 to 60 Celsius). The cool shot button 116 is configured to be actuated by a user to cause a shot of cool, unheated air to flow out the output end 102A of the hair dryer 100, e.g., to set hairstyle. The reset button, e.g., an appliance leakage circuit interrupter (ALCI), is configured to be actuated by a user to reset the hair dryer 100 in the event of an error. The airflow, temperature, cool shot, and reset controls are each in the form of a depressible button in the illustrated embodiment but any one or more of these controls can have another form, such as a lever, a rotatable knob, etc.

The power cable 106 extends from the handle 104 and is electrically connected to the electrical components within the hair dryer 100, such as the motor, heater, processor, and memory. The plug 108 is at an end of the power cable 106 opposite to the handle 104 and is configured to be plugged into an electrical outlet for providing AC power to the hair dryer 100.

Figure 3:
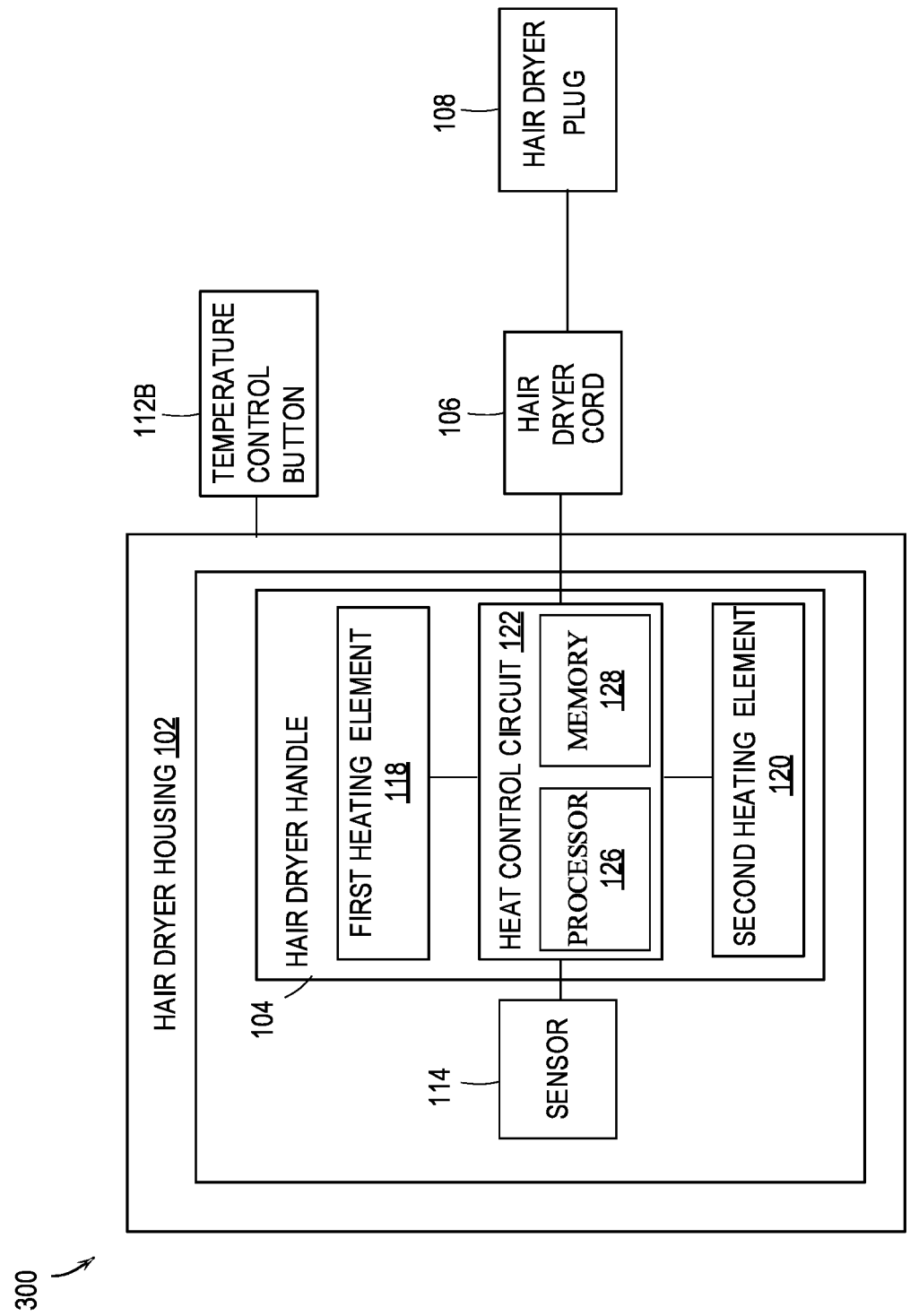
FIG. 3 is a schematic view of the hair dryer of FIG. 1.

As shown in FIG. 3, the hair dryer 100 includes a first heating element (also referred to herein as a "heater") 118, a second heating element 120, and a heat control circuit 122. The first heating element 118, the second heating element 120, and the heat control circuit 122 can be disposed within the handle 104. The heat control circuit 122 facilitates the hair dryer's satisfaction of regulatory requirements (e.g., IEC requirements and Federal Communications Commission part 15 regarding conducted emissions for devices qualifying under 47 of the Code of Federal Regulations 15.5), without the hair dryer 100 needing to include a filter and/or other bulky filtering components on the hair dryer's cord 106, such as an electromagnetic compatibility (EMC) box 124 that is shown in phantom in FIG. 1 indicative of an EMC box for traditional hair dryers.

In the embodiment illustrated in FIG. 3, the hair dryer 100 includes two heaters 118, 120 configured to be controlled using the power distribution described herein. In other embodiments, the hair dryer 100 can include one heater, e.g., only the first heater 118, configured to be controlled using the power distribution described herein, or can include more than two heaters. The first and second heating elements 118, 120 are configured to heat unheated air for output as heated air from the output end 102A of the hair dryer 100. The first and second heating elements 118, 120 are each of a same type and can have any of a variety of configurations, as will be appreciated by a person skilled in the art.

The heat control circuit 122 is configured to control the first and second heating elements 118, 120 and thus control heating of the air that is output from the hair dryer 100 at the output end 102A. As discussed further below, the heat control circuit 122 is configured to control the first and second heating elements 118, 120 using power distribution. In general, the heat control circuit 122 is configured to control the first and second heating elements 118, 120 to achieve the temperature setting selected by a user using the temperature control button 112B. In some implementations, the temperature setting is a particular desired temperature. In other implementations, the temperature setting is a desired temperature range, e.g., a first temperature range corresponding to a low temperature setting, a second temperature range corresponding to a medium temperature setting and being higher than the first temperature range, and a third temperature range corresponding to a high temperature setting and being higher than the second temperature range.

The heat control circuit 122 includes a microcontroller (MCU) including a processor 126 and a memory 128. The processor 126 and the memory 128 are interconnected using a system bus (not shown). The processor 126 is configured to process instructions for execution. In some implementations, the processor 126 can be a single-threaded processor. In alternate implementations, the processor 126 can be a multi-threaded processor. The processor 126 is also configured to process instructions stored in the memory 128, including receiving information from a temperature sensor 114 (e.g., an negative temperature coefficient (NTC) thermistor or other type of temperature sensor) and sending information to the first and second heating elements 118, 120 to control the first and second heating elements 118, 120. In an exemplary embodiment, the temperature sensor 114 is mounted within the housing 102 close to the output end 102B where heated air is expelled. The memory 128 is configured to store information, including the instructions configured to be executed by the processor 126. In some implementations, the memory 128 can be a computer-readable medium. In alternate implementations, the memory 128 can be a volatile memory unit. In yet some other implementations, the memory 128 can be a non-volatile memory unit.

In some implementations, the memory 128 and the processor 126 of the heat control circuit 122 are dedicated to the heat control circuit 122, and the hair dryer 100 includes at least one additional memory and at least one additional processor configured to control other aspects of the hair dryer 100, e.g., airflow speed, power, etc. In other implementations, the memory 128 and the processor 126 of the heat control circuit 122 are a memory and processor for the hair dryer 100, e.g., are not dedicated to the heat control circuit 122, and are thus also usable for other aspects of the hair dryer 100, e.g., airflow speed, power, etc. For example, the memory 128 of the hair dryer 100 (e.g., the memory of the heat control circuit 122) stores therein an algorithm configured to be executed by the processor 126 of the hair dryer 100 (e.g., the processor of the heat control circuit 122) to provide power distribution. In general, the power distribution is configured to control the heat provided by the first and second heating elements 118, 120 by controlling the AC power percentage value during each cycle, as discussed further herein.

Figure 4:
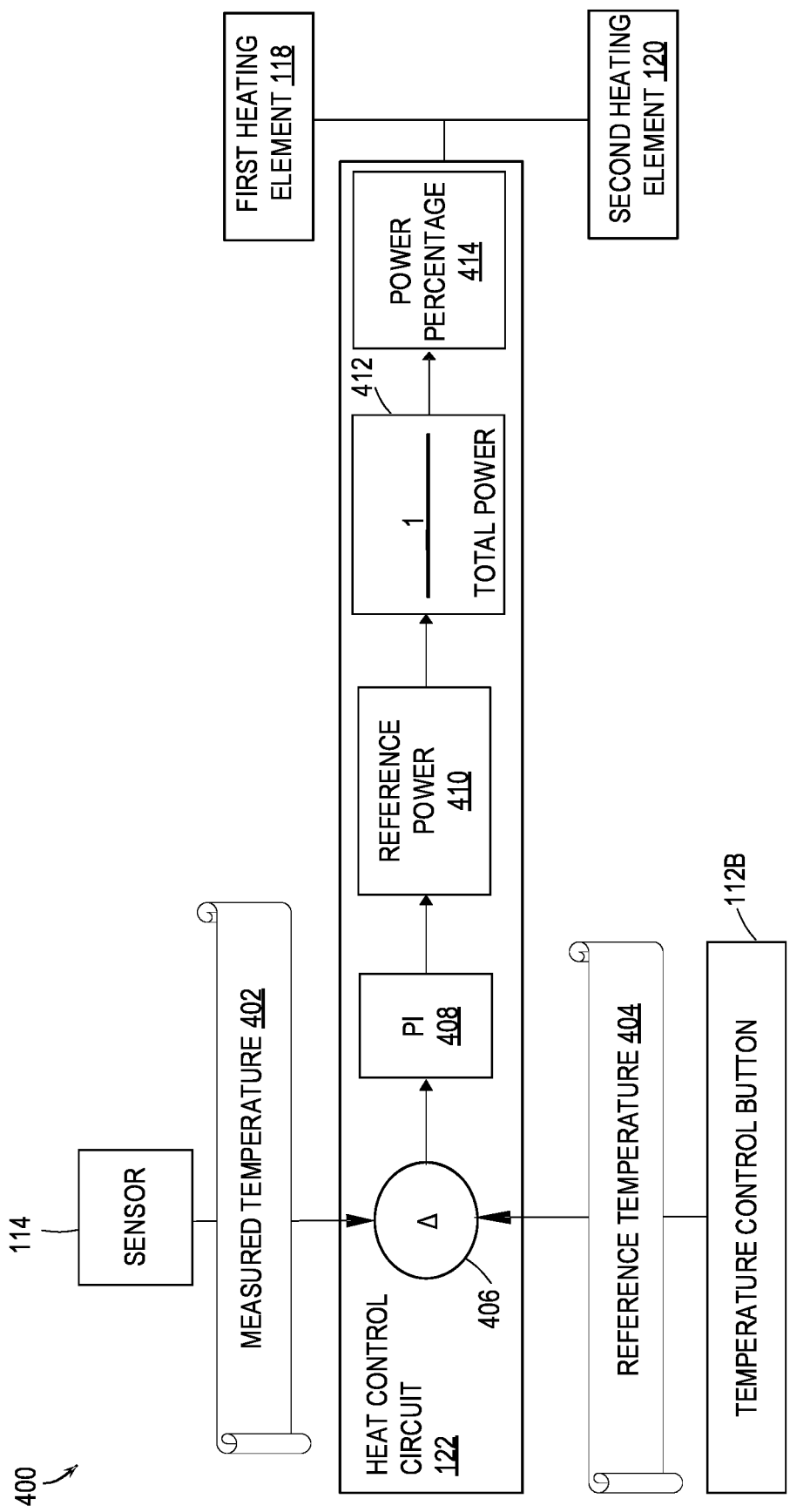
FIG. 4 is a schematic view of power distribution derivation for the hair dryer of FIG. 1.

FIG. 4 illustrates one embodiment of a power distribution derivation diagram 400 for the hair dryer 100 of FIG. 1, although similar power distribution can be implemented for other hair dryers and other home appliances. The heat control circuit 122 (e.g., the processor 126 thereof) is configured to receive a measured temperature 402 from the temperature sensor 114 and a reference temperature 404 from the temperature control button 112B. The heat control circuit 122 (e.g., the processor 126 thereof) is configured to process the received measured temperature 402 and the received reference temperature 404 to determine a temperature difference (Δ) 406 between the measured and reference temperatures 402, 404. The heat control circuit 122 (e.g., the processor 126 thereof) is configured to process the temperature difference (4) 406 to determine a power input (PI) 408. $\Delta_{temperture}=\text{Temperature}_{reference}-\text{Temperature}_{measured}$ $\Delta_{temperture}$ is the temperature difference 406 output signal. Temperature$_{reference}$ is the received reference temperature 404 output signal. Temperature$_{measured}$ is the measured temperature 402 output signal. The heat control circuit 122 (e.g., the processor 126 thereof) is configured to process the PI 408 to determine a reference power 410. $P_{reference}^*=K_p \times \Delta_{temperture}+K_i \times \int_0^{25cycles} \Delta_{temperture} dt$. $\Delta_{temperture}$ is 408 input signal. $P_{reference}^*$ is the reference power 410 output signal. $K_p$ and $K_i$ are tuned based on system response time which are related to heater selection and air flow rate. The heat control circuit 122 (e.g., the processor 126 thereof) is configured to process the reference power 410 to determine a total power 412 to be applied within a particular number (e.g., 25 or other predetermined number) of cycles.

$$P_{25cycles}^* \% = \frac{P_{reference}^*}{P_{rated}},$$

$P_{25cycles}^* \%$ is the total power 412 output signal. Prated is a lump sum of all heating elements max power.

The heat control circuit 122 (e.g., the processor 126 thereof) is configured to process the total power 412 to generate a set of randomly distributed AC power percentage values 414 that are selected from a set of possible values. The set of possible values is predetermined. In an exemplary embodiment, the set of possible values includes integers between a predetermined minimum AC power percentage (e.g., 0%) and a predetermined maximum AC power percentage (e.g., 4%) or any numerical values (e.g., 0, 0.5, 1, 1.5, 2, 2.5, 2.8, 3.2, etc.) that can be added together to generate the determined value of the total power 412 as a sum. For example, the heat control circuit 122 can generate 25 numbers, each being between a predetermined minimum integer of 0 and a predetermined maximum integer of 4, where their sum is the total power 412. The order of the generated numbers can be randomized to avoid repeated patterns. The heat control circuit 122 can be configured to provide a power command per each cycle in the set of cycles to the heating elements 118, 120 according to the determined numerical values.

One of the heaters, such as the first heating element 118, is set as a primary heating element and the other of the heaters, such as the second heating element 120, is set as a secondary heating element. The AC power percentage values (e.g., 1 and 2 in the embodiment of FIG. 5 discussed below) that are equal to or below a set threshold (e.g., 2%) are automatically assigned, by the heat control circuit 122 (e.g., the processor 126 thereof), to the primary heating element (e.g., first heating element 118). The AC power percentage values (e.g., 3 and 4 in the embodiment of FIG. 5) that are above the set threshold (e.g., 2%) can be automatically distributed, by the heat control circuit 122 (e.g., the processor 126 thereof), between the primary heating element (e.g., first heating element 118) and the secondary heating element (e.g., second heating element 120). In some implementations, more than two heating elements can be used, which may be better for providing an increased flexibility to randomly distribute power command over cycles, e.g., over 25 cycles. The logics can arbitrarily set the AC power percentage value for heater 1, heater 2 . . . heater n for every cycles shown in FIG. 5 as soon the total power 412 ($P_{25cycles}^* \%$) are added up and matches the targeting number.

The randomly distributed AC power percentage values allow the hair dryer 100 to operate and achieve the desired reference temperature 404 while avoiding the occurrence light flickering, a circuit breaker trip, and/or power fluctuation of other appliances due to aperiodic current draw.

Figure 5:
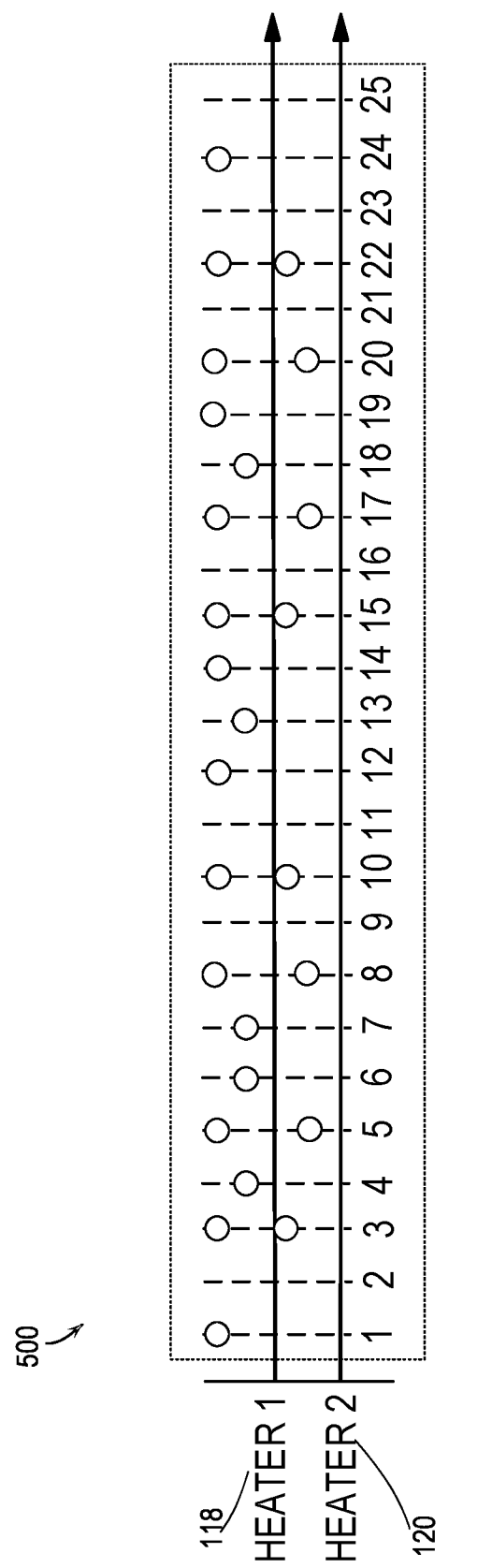
FIG. 5 illustrates example AC power percentage values that can be randomly distributed across a number of cycles, according to some implementations of the current subject matter.

FIG. 5 illustrates one embodiment of a set of AC power percentage values that can be randomly distributed across the set number of cycles. In the illustrated example in which the number of cycles is 25 such that 25 numbers are generated, and the total power 412 is 44%, the set of AC power percentage values includes in order for the 25 cycles: {2, 0, 4, 1, 3, 1, 1, 3, 0, 4, 0, 2, 1, 2, 4, 0, 3, 1, 0, 3, 0, 4, 0, 2, 3}.

Figure 6A:
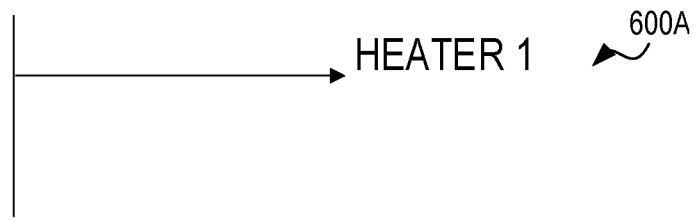
FIGS. 6A-6C include examples of graphs showing embodiments of an AC power percentage derivation for a single heater, according to some implementations of the current subject matter.
Figure 6B:
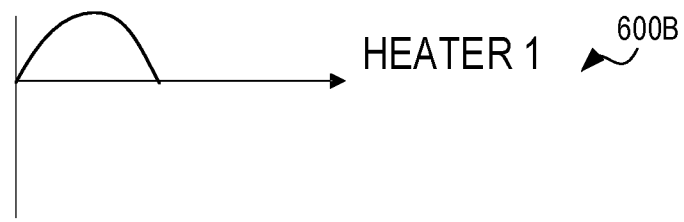
Figure 6C:
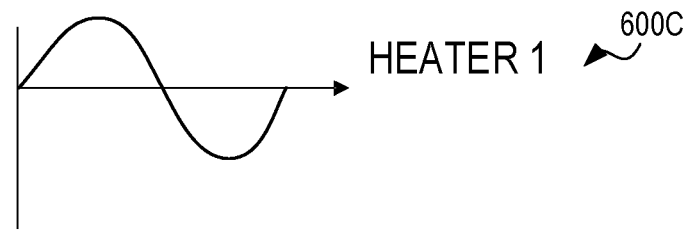

FIGS. 6A-6C illustrate embodiments of AC power sinusoidal curves for a single heater, with a single or double periods along the x axis, which represents time (t), for an embodiment such as in FIG. 5 in which AC power percentage values can be randomly selected as 0%, 1%, or 2%. The vertical axis represents voltage (V). The sinusoidal curve can be either at a 60 Hz frequency or a 50 Hz frequency, depending on standards in different regions of the world. As shown in FIGS. 6A-6C, as the AC power signal oscillates, it crosses the zero line (x axis) every 180° at a completion of a period. In the example of FIG. 6A, a 0% power per cycle 600A (e.g., cycles 2, 9, 11, 16, 21, 23, and 25 of FIG. 5) includes not activating the first heater 118. In the example of FIG. 6B, a 1% power per cycle 600B (e.g., cycles 4, 6, 7, 13, and 18 of FIG. 5) includes turning on (activating) the first heater 118 for a single period. In the example of FIG. 6C, a 2% power per cycle 600C (e.g., cycles 1, 12, 14, 19, and 24 of FIG. 5) includes turning on the first heater 118 for a double period.

Figure 7A:
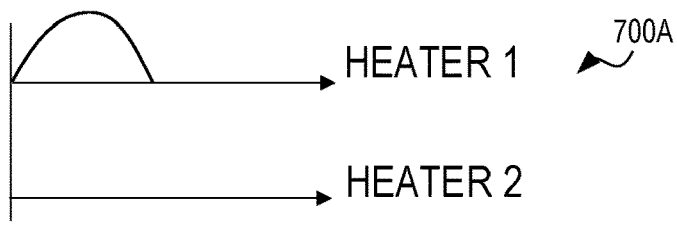
FIGS. 7A-7D include examples of graphs showing embodiments of an AC power percentage distribution for a pair of heaters, according to some implementations of the current subject matter.
Figure 7B:
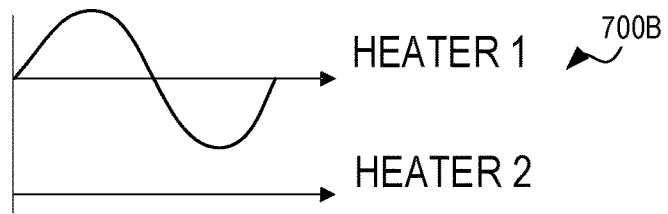
Figure 7C:
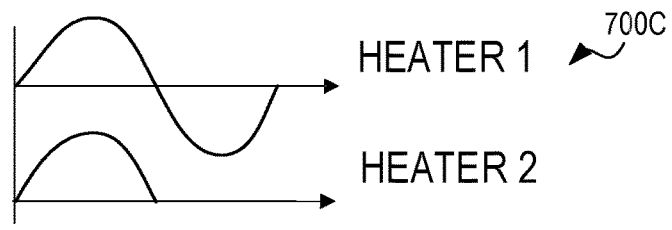
Figure 7D:
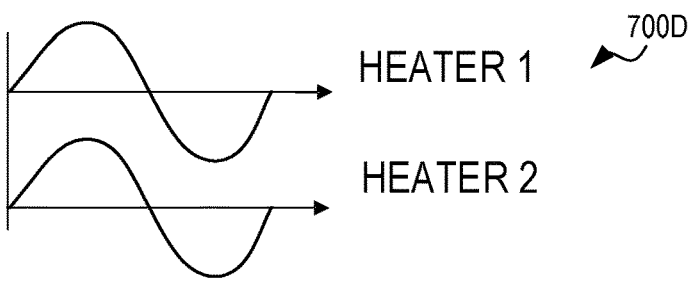

FIGS. 7A-7D illustrate embodiments of AC power sinusoidal curves with a single or double periods along the x axis, which represents time (t), for an embodiment such as in FIG. 5 in which AC power percentage values can be randomly selected as 1%, 2%, 3%, or 4% using a group of two heaters. The vertical axis represents voltage (V). The sinusoidal curve can be either at a 60 Hz frequency or a 50 Hz frequency, depending on standards in different regions of the world. In FIGS. 7A-7D the first heater 118 is the primary heater and the second heater 120 is the secondary heater. As shown, as the AC power signal oscillates, it crosses the zero line (x axis) every 180° at a completion of a period. In the example of FIG. 7A, a 1% power per cycle 700A (e.g., cycles 4, 6, 7, 13, and 18 of FIG. 5) includes turning the first heater 118 on for a single period, while the second heater 120 remains off. In the example of FIG. 7B, at 2% power per cycle 700B (e.g., cycles 1, 12, 14, 19, and 24 of FIG. 5) includes turning the first heater 118 on for a double period, while the second heater 120 remains off. In the example of FIG. 7C, at 3% power per cycle 700C (e.g., cycles 5, 8, 17, and 20 of FIG. 5) includes turning the first heater 118 on for a double period and turning the second heater 120 on for a single period. The single period of the second heater 120 is during the first period of the first heater's double period. In the example of FIG. 7D, 4% power per cycle 700D (e.g., cycles 3, 10, 15, and 22 of FIG. 5) includes turning the first heater 118 on for a double period and turning the second heater 120 on for a double period. The double periods of the first and second heaters 118, 120 occur at the same time. A 0% power cycle (e.g., cycles 2, 9, 11, 16, 21, 23 and 25 in FIG. 5) is not specifically illustrated since there is no sinusoidal curve in a 0% power cycle as no power is being provided to the first heater 118 or the second heater 120, e.g., the first and second heaters 118, 120 are each off.

Figure 8A:
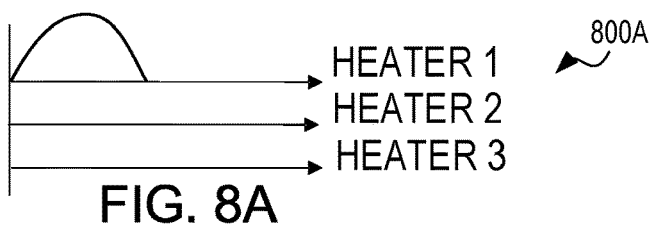
FIGS. 8A-8F include examples of graphs showing embodiments of an AC power sinusoidal curve of AC power percentages for a group of three heaters, according to some implementations of the current subject matter.
Figure 8B:
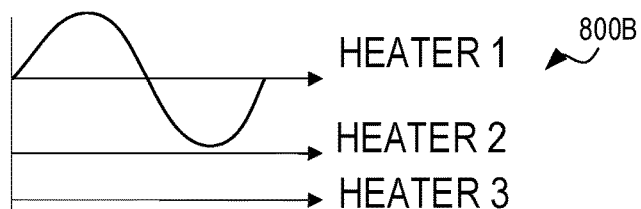
Figure 8C:
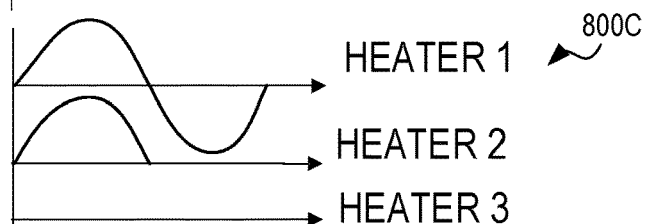
Figure 8D:
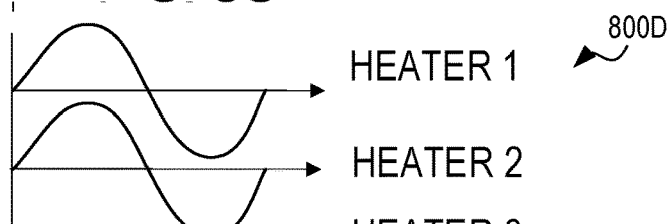
Figure 8E:
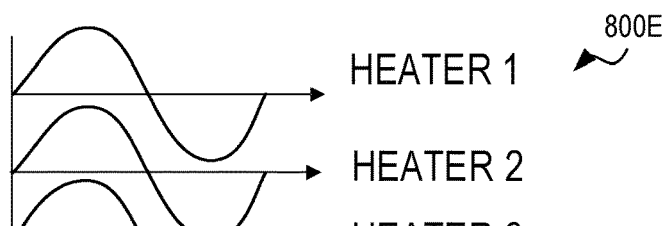
Figure 8F:
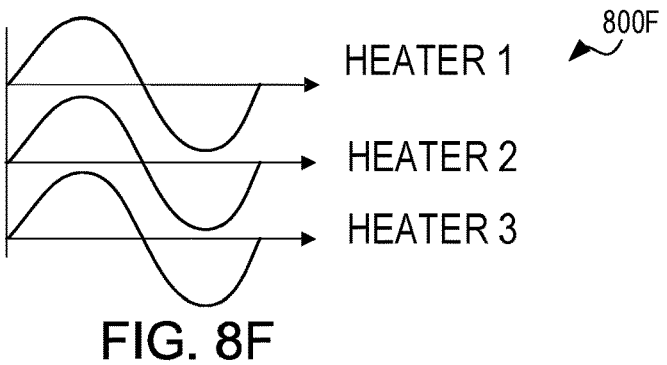

FIGS. 8A-8F illustrate embodiments of AC power sinusoidal curves with a single or double periods along the x axis, which represents time (t), for an embodiment such as in FIG. 5 in which AC power percentage values can be randomly selected as 0.67%, 1.33%, 2%, 2.6%, 3.3% or 4% using a group of three heaters. The vertical axis represents voltage (V). The sinusoidal curve can be either at 80 Hz frequency or at 50 Hz frequency, depending on standards in different regions of the world. In FIGS. 8A-8F the first heater 118 is the primary heater and the second heater 120 and the third heater are the secondary heaters. As shown, as the AC power signal oscillates, it crosses the zero line (x axis) every 180° at a completion of a period. In the example of FIG. 8A, a 0.67% power per cycle 800A includes turning the first heater 118 on for a single period, while the second and third heaters remain turned off. In the example of FIG. 8B, 1.33% power per cycle 800B includes turning the first heater 118 on for a double period, while the second and third heaters remain turned off. In the example of FIG. 8C, at 2% power per cycle 800C (e.g., cycles 1, 12, 14, 19, and 24 of FIG. 5) includes turning on the first heater 118 for a double period and turning on the second heater 120 for a single period, while the third heater remains turned off. The single period of the second heater 120 is during the first period of the first heater's double period. In the example of FIG. 8D, 2.6% power per cycle 800D includes turning the first heater 118 on for a double period and turning the second heater 120 on for a double period, while the third heater remains turned off. The double periods of the first and second heaters 118, 120 occur at the same time. In the examples of FIGS. 8E and 8F, 3.3% and 4%, respectively power per cycle 800E and 800F includes turning on each of the first and second heaters 118, 120 for a double period and turning on the third heater for a single period or for a double period, respectively.

Figure 9:
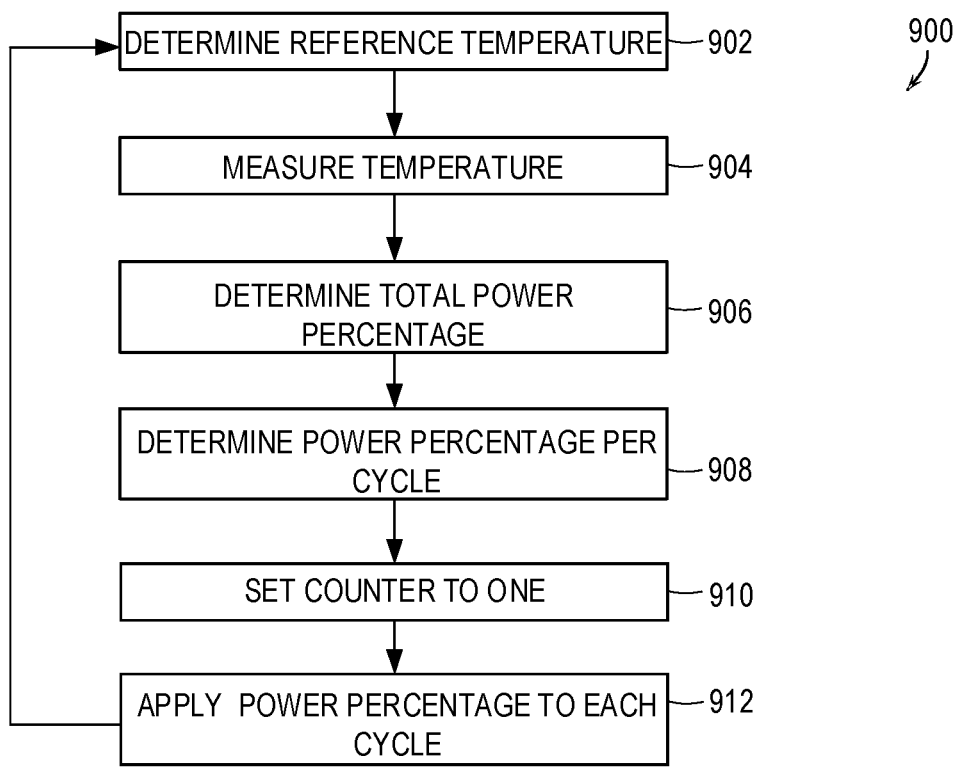
FIG. 9 illustrates an example of one embodiment of a process, according to some implementations of the current subject matter.

FIG. 9 illustrates one embodiment of a process 900 for power distribution heat control. The example process 900 is described with respect to the hair dryer 100 of FIGS. 1-4 such that the process 900 is executed by the heat control circuit 122 (e.g., the controller thereof), but can be similarly implemented using other hair dryers or using other devices that use heaters for heat control, such as space heaters. Additionally, the process 900 is described with respect to the two heaters 118, 120 of the hair dryer 100 but can be similarly implemented using one heater or more than two heaters of an appliance. For example, if the appliance has only one heater, it can only provide 0%, 1%, and 2% as shown for the first heater 118 in FIG. 6A (showing 1%) and FIG. 6B (showing 2%), with 0% as discussed above. As another example, if the appliance includes more than two heaters, the appliance has an increased control flexibility. A single-heater system gives 3 power options as 0%, 2% and 4% per cycle (see FIGS. 6A-6C). A two-heater system comes with 5 power options as 0%, 1%, 2%, 3%, 4% per cycle (see FIGS. 7A-7D). A three-heater system brings 7 power options as 0%, 0.67%, 1.33%, 2%, 2.67%, 3.33%, 4% per cycle (see FIGS. 8A-8F).

In the process 900, a reference temperature is determined 902. For example, the reference temperature is determined 902 in response to determining that the hair dryer 100 is powered on (e.g., when the power button 110 is actuated by a user to turn on the hair dryer 100) and a reference temperature is selected (e.g., the reference temperature 404 is entered by using a temperature control button 112B of the hair dryer 100). As another example, the reference temperature can be determined 902 during an operation of the hair dryer 100 if the reference temperature is modified (e.g., reference temperature 404 is updated by using the temperature control button 112B of the hair dryer 100). In some implementations, in response to determining 902 the reference temperature, the heating elements 118, 120 can be gradually powered to be heated to a portion of the reference temperature for a warm-up time interval (e.g., approximately 1 to 3 seconds).

The process 900 also includes receiving a temperature of air within a portion of the hair dryer (e.g., heated air being output from an output end 102A of the hair dryer 100) measured 904 by a sensor (e.g., using the temperature sensor 114). The temperature can be measured 904 before the start of a set of cycles (at the end of the warm-up time interval) or at a present nominal amount of time after the start of a set of cycles (e.g., to account for a nominal delay of the processor 126 of the hair dryer 100). The receipt of the temperature measurement 904 is repeated throughout the operation of the powered-on hair dryer 100. The difference between the reference temperature and the measured 904 temperature is used to determine whether more heat is needed to achieve the desired temperature (e.g., if the measured temperature is below the desired temperature range) or if less heat is needed to achieve the desired temperature (e.g., if the measured temperature is above the desired temperature range).

A total AC power percentage is determined 906 based on the difference between the determined 902 reference temperature and the measured 904 temperature. For example, the difference between the determined 902 reference temperature and the measured 904 temperature is used to determine a power input that is processed to derive the total AC power percentage to be applied during a set of multiple (e.g., 25 or other plural number) cycles to one or more heating elements (e.g., heating elements 118, 120).

A set of AC power percentage values is subsequently determined 908, such that when added they equal the total AC power percentage. The set of AC power percentage values are determined 908 from a set of predetermined values or a range of values. The order of the generated numbers can be randomized (using a randomization algorithm) to avoid repeated patterns. For example, as discussed above with respect to FIG. 5, the heat control circuit 122 can generate 25 numbers which are each between 0 and 4 and their sum is the total power 412 (e.g., 47)

After the power percentage per cycle has been determined 908, a value of a counter (e.g., a counter of the control circuit 122) is set 910 to one. The counter value is stored in the memory 127 of the hair dryer 100 to track the power distribution throughout cycles. The initial value of the counter is set 910 to one in the illustrated embodiment but can be set 910 to another value. The set of predetermined number of cycles begins at one and the value of the counter incrementally increases in unitary values until it reaches the set number (e.g., 25 in the embodiment of FIG. 5) of cycles in a set that can also be stored in the memory 128 of the hair dryer 100.

With the counter set 910 to one (or other initial counter value), the set of AC power percentage values are applied 912 to control the first heating element 118 and the second heating element 120 such that the total AC power percentage leads to a temperature adjustment to reach the reference temperature. The heat control circuit 122 provides a power command per each cycle in the set of cycles to the heating elements 118, 120 according to the determined numerical values. In some implementations, each AC power percentage value can correspond to a preset waveform to be applied to a primary heating element, and, in some cases, to the secondary heating element, as described with reference to FIGS. 6A-6D. In some implementations, the heat control circuit 122 uses an internal clock to track a duration of each cycle and coordinate the change in power command per cycle. In some implementations, the heat control circuit 122 uses a zero-cross detection circuit to determine the cycle and coordinate the change in power command per cycle.

The process 900 continues the sets of cycles until the power is turned off (e.g., the hair dryer's power button 110 is actuated to turn off the hair dryer 100). The example process 900 continues the sets of cycles until the power is turned off by re-measuring the temperature and adjusting the power distribution for each subsequent set of cycles.

An actuation of the cool shot button 116 at any time during performance of the process 900 temporarily stops the first and second heaters 118, 120 from providing any heat (if not already off) while the cool shot button 116 is depressed to allow for a shot of cool, unheated air to flow out the output end 102A of the hair dryer 100 until the cool shot button 116 is released. For example, if the cool shot button 116 is actuated during a set of cycles, the counter value remains constant during the cool shot button actuation and the set of cycles is completed if the hair dryer 100 is not power off after the cool shot button 116 becomes unactuated.

The subject matter described herein can be implemented in analog electronic circuitry, digital electronic circuitry, and/or in computer software, firmware, or hardware, including the structural means disclosed in the specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, algorithm, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code).

The processes and logic flows described in the specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices). The processor and the memory can be supplemented by, or incorporated in, special purpose logic circuitry.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor). The modules described herein can be combined, integrated, separated, and/or duplicated to support various applications. Also, a function described herein as being performed at a particular module can be performed at one or more other modules and/or by one or more other devices instead of or in addition to the function performed at the particular module.

Further non-limiting aspects or implementations are set forth in the following numbered examples:

Example 1: An apparatus, comprising: a first heating element and a second heating element, the first and second heating elements being configured to generate heat to be output in response to being powered with alternating current (AC) power; a temperature sensor configured to detect a temperature of the generated heat; and a processor configured to, based on the temperature, generate a set of cycles with a random distribution of a total AC power percentage among the cycles, an AC power percentage of each of the cycles being within a set of AC power percentage values, to control the first heating element and the second heating element such that the total AC power percentage leads to a temperature adjustment to reach a reference temperature.

Example 2: The apparatus of example 1, wherein the processor is configured to generate the set of cycles with the random distribution of the AC power percentage between cycles in response to completion of a previous set of cycles.

Example 3: The apparatus of any one of the preceding examples, wherein the processor is further configured to receive the reference temperature corresponding to a setting of a temperature control button.

Example 4: The apparatus of any one of the preceding examples, wherein the set of AC power percentage values comprises a plurality of integers between a minimum AC power percentage and a maximum AC power percentage.

Example 5: The apparatus of any one of the preceding examples, wherein the minimum AC power percentage is 0% and the maximum AC power percentage is 4%.

Example 6: The apparatus of any one of the preceding examples, wherein the set of cycles comprises twenty-five cycles.

Example 7: The apparatus of any one of the preceding examples, wherein the temperature adjustment includes the processor controlling at least one of the first and second heating elements to increase or decrease the temperature.

Example 8: The apparatus of any one of the preceding examples, wherein each of the set of cycles corresponds to a first predetermined number of periods of the AC power at which one of the first and second heating elements is turned on to heat the air to be output from the device.

Example 9: The apparatus of any one of the preceding examples, wherein during a portion of the set of cycles the first heating element is configured to output heat more or equal to the heat output by the second heating element.

Example 10: The apparatus of any one of the preceding examples, wherein the generated heat is configured to heat air output from the apparatus.

Example 11: The apparatus of any one of the preceding examples, wherein the apparatus is a hair dryer.

Example 12: The apparatus of any one of the preceding examples, further comprising a non-transitory computer-readable storage medium storing an algorithm configured to be executed by the processor to generate the set of cycles.

Example 13: A method, comprising: determining a temperature of a first heating element and of a second heating element; and generating a set of cycles with a random distribution of a total AC power percentage among the cycles, an AC power percentage of each of the cycles being within a set of AC power percentage values, to control the first heating element and the second heating element such that the total AC power percentage leads to a temperature adjustment to reach a reference temperature.

Example 14: The method of example 13, wherein first and second heating elements are included in a hair dryer; and the method further comprises outputting heated air from the hair dryer according to the generated set of cycles.

Example 15: A non-transitory computer-readable storage medium comprising a program for execution by the processor, the program comprising instructions which, when executed by the processor, cause an apparatus to perform operations comprising: determining a temperature of a first heating element and of a second heating element; and generating a set of cycles with a random distribution of a total AC power percentage among the cycles, an AC power percentage of each of the cycles being within a set of AC power percentage values, to control the first heating element and the second heating element such that the total AC power percentage leads to a temperature adjustment to reach a reference temperature.

One skilled in the art will appreciate further features and advantages of the devices, systems, and methods based on the above-described embodiments. Accordingly, the disclosure is not to be limited by what has been particularly shown and described, except as indicated by the appended claims.

All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. An apparatus, comprising:
a first heating element and a second heating element, the first and second heating elements being configured to generate heat to be output in response to being powered with alternating current (AC) power;
a temperature sensor configured to detect a temperature of the generated heat; and
a processor configured to, based on the temperature, generate a set of cycles, wherein a percentage of a total AC power within the set of cycles is randomly distributed to the first and second heating elements, an AC power percentage of each of the cycles being within a set of AC power percentage values, to control the first heating element and the second heating element such that the total AC power percentage leads to a temperature adjustment to reach a reference temperature.

2. The apparatus of claim 1, wherein the processor is configured to generate the set of cycles with the random distribution of the AC power percentage between cycles in response to completion of a previous set of cycles.

3. The apparatus of claim 1, wherein the processor is further configured to receive the reference temperature corresponding to a setting of a temperature control button.

4. The apparatus of claim 1, wherein the set of AC power percentage values comprises a plurality of integers between a minimum AC power percentage and a maximum AC power percentage.

5. The apparatus of claim 1, wherein the minimum AC power percentage is 0% and the maximum AC power percentage is 4%.

6. The apparatus of claim 1, wherein the set of cycles comprises twenty-five cycles.

7. The apparatus of claim 1, wherein the temperature adjustment includes the processor controlling at least one of the first and second heating elements to increase or decrease the temperature.

8. The apparatus of claim 1, wherein each of the set of cycles corresponds to a first predetermined number of periods of the AC power at which one of the first and second heating elements is turned on to heat air to be output from the device.

9. The apparatus of claim 1, wherein during a portion of the set of cycles the first heating element is configured to output heat more or equal to the heat output by the second heating element.

10. The apparatus of claim 1, wherein the generated heat is configured to heat air output from the apparatus.

11. The apparatus of claim 1, wherein the apparatus is a hair dryer.

12. The apparatus of claim 1, further comprising a non-transitory computer-readable storage medium storing an algorithm configured to be executed by the processor to generate the set of cycles.

13. A method, comprising:
determining a temperature of a first heating element and of a second heating element; and generating a set of cycles, wherein a percentage of a total AC power within the set of cycles is randomly distributed to the first and second heating elements, an AC power percentage of each of the cycles being within a set of AC power percentage values, to control the first heating element and the second heating element such that the total AC power percentage leads to a temperature adjustment to reach a reference temperature.

14. The method of claim 13, wherein the first and second heating elements are included in a hair dryer; and
the method further comprises outputting heated air from the hair dryer according to the generated set of cycles.

15. A non-transitory computer-readable storage medium comprising a program for execution by the processor, the program comprising instructions which, when executed by the processor, cause an apparatus to perform the method of claim 13.

\* \* \* \* \*